United States Patent
Kim et al.

(10) Patent No.: US 9,697,116 B2
(45) Date of Patent: Jul. 4, 2017

(54) STORAGE SYSTEM AND WRITING METHOD THEREOF

(71) Applicants: Sangmok Kim, Seoul (KR); Kyung Ho Kim, Seoul (KR); Yeong-jae Woo, Suwon-si (KR); Seunguk Shin, Seoul (KR); Sungyong Seo, Seongnam-si (KR)

(72) Inventors: Sangmok Kim, Seoul (KR); Kyung Ho Kim, Seoul (KR); Yeong-jae Woo, Suwon-si (KR); Seunguk Shin, Seoul (KR); Sungyong Seo, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 440 days.

(21) Appl. No.: 14/451,000

(22) Filed: Aug. 4, 2014

(65) Prior Publication Data

US 2015/0046670 A1    Feb. 12, 2015

(30) Foreign Application Priority Data

Aug. 8, 2013  (KR) .................... 10-2013-0094291

(51) Int. Cl.
   *G06F 12/02*    (2006.01)
   *G06F 11/14*    (2006.01)

(52) U.S. Cl.
   CPC ...... *G06F 12/0246* (2013.01); *G06F 11/1471* (2013.01); *G06F 2212/7201* (2013.01); *G06F 2212/7204* (2013.01)

(58) Field of Classification Search
   None
   See application file for complete search history.

(56) References Cited

U.S. PATENT DOCUMENTS

| 7,047,355 B2 | 5/2006 | Nakatani et al. |
| 7,076,599 B2 | 7/2006 | Aasheim et al. |

(Continued)

FOREIGN PATENT DOCUMENTS

| KR | 20020051567 A | 6/2002 |
| KR | 100866513 B1 | 11/2008 |

OTHER PUBLICATIONS

Vijayan Prabhakaran et al., "Transactional Flash", 8th USENIX Symposium on Operating Systems Design and Implementation, p. 147-160.

(Continued)

*Primary Examiner* — Daniel Tsui
*Assistant Examiner* — Leandro Villanueva
(74) *Attorney, Agent, or Firm* — Harness, Dickey & Pierce, P.L.C.

(57) ABSTRACT

A writing method of a storage system which includes a host and a storage connected to the host, includes receiving journal data during a generation of a data writing transaction; inserting in a first map table, a plurality of entries, each entry including a first logical address of a first logical area of the storage and a second logical address of a second logical area of the storage; writing the journal data to a physical area of the storage corresponding to the first logical address; and remapping the physical area from the first logical address onto the second logical address using the plurality of entries when a size of a usable space of the first logical area is less than a desired value.

20 Claims, 17 Drawing Sheets

(56) References Cited

U.S. PATENT DOCUMENTS

| | | | |
|---|---|---|---|
| 7,139,883 | B2 | 11/2006 | Aasheim et al. |
| 7,685,378 | B2 | 3/2010 | Arakawa et al. |
| 8,225,035 | B2 | 7/2012 | Colligan |
| 8,452,929 | B2 | 5/2013 | Bennett |
| 2003/0163635 | A1 | 8/2003 | Aasheim et al. |
| 2004/0111557 | A1 | 6/2004 | Nakatani et al. |
| 2005/0216653 | A1 | 9/2005 | Aasheim et al. |
| 2006/0227585 | A1 | 10/2006 | Tomoda |
| 2008/0189490 | A1 | 8/2008 | Cheon et al. |
| 2008/0201391 | A1 | 8/2008 | Arakawa et al. |
| 2009/0150599 | A1 | 6/2009 | Bennett |
| 2010/0268866 | A1 | 10/2010 | Colligan |
| 2011/0106804 | A1 | 5/2011 | Keeler et al. |
| 2012/0166709 | A1 | 6/2012 | Chun |
| 2012/0317342 | A1* | 12/2012 | Choi ............ G06F 12/0246 711/103 |
| 2013/0080732 | A1 | 3/2013 | Nellans et al. |
| 2015/0074339 | A1* | 3/2015 | Cheriton ........ G06F 12/0804 711/103 |
| 2015/0113201 | A1* | 4/2015 | Kong ............ G11B 20/10009 711/4 |

OTHER PUBLICATIONS

Eran Gal et al., "A Transactional Flash File System for Microcontrollers", 2005 USENIX Annual Technical Conference, p. 89-104.

Hyun Jin Choi et al., "JFTL: A Flash Translation Layer Based on a Journal Remapping for Flash Memory", ACM Transactions on Storage, vol. 4, No. 4, Article 14, Pulication date: Jan. 2009.

\* cited by examiner

STORAGE SYSTEM AND WRITING METHOD THEREOF

CROSS-REFERENCE TO RELATED APPLICATIONS

A claim for priority under 35 U.S.C. §119 is made to Korean Patent Application No. 10-2013-0094291 filed Aug. 8, 2013, in the Korean Intellectual Property Office, the entire contents of which are incorporated herein by reference.

BACKGROUND

1. Field

Example embodiments of the inventive concepts described herein relate to a storage system and/or a write method thereof.

2. Related Art

A storage system consists of a host and a storage device and is connected through a variety of interface standards such as UFS (Universal Flash Storage), SATA (Serial ATA), SCSI (Small Computer Small Interface), SAS (Serial Attached SCSI), eMMC (embedded MultiMediaCard), etc.

A common problem associated with data storing is corruption of a part of a file system at a storage medium. Data corruption causes interruption of a data writing operation of a storage device. Data corruption, for example, is generated as a consequence of power loss. An approach of evading the data corruption includes utilizing a journaling file system that logs a change on a storage medium (e.g., a hard disk drive) before the change is executed.

Therefore, when the power loss arises, a journaled change is replayed or executed such that an actual data structure conforms to the journaled change. It may be difficult to replay journaled actions that are incomplete due to the power loss.

SUMMARY

One aspect of at least one example embodiment of the inventive concepts is directed to provide a writing method of a storage system which includes a host and a storage connected to the host, the writing method comprising receiving journal data at generation of a transaction; inserting in a first map table, a plurality of entries each formed of a pair of a first logical address directing a first logical area of the storage and a second logical address directing a second logical area of the storage; writing the journal data to a physical area of the storage corresponding to the first logical address; and remapping the first logical address corresponding to the physical area onto the second logical address using the plurality of entries when a size of a usable space of the first logical area is less than a predetermined value, According to at least some example embodiments, the first map table is generated by the host.

According to at least some example embodiments, the first map table is sent to the storage from the host in an operation of recognizing the storage.

According to at least some example embodiments, each of the plurality of entries comprises a first start address of the first logical area, a second start address of the second logical area, and a length indicating a size of the first and second start addresses.

According to at least some example embodiments, the writing method further comprises, after receiving the journal data, issuing a header command directing a transaction writing operation and a plurality of write commands for writing the journal data to the physical area.

According to at least some example embodiments, the header command comprises the plurality of entries.

According to at least some example embodiments, each of the write commands comprises a context identification indicating whether to be last data of a transaction writing operation.

According to at least some example embodiments, writing the journal data to a physical area comprises storing user page data, the first logical address, the second logical address, and direction data indicating whether a transaction is ended in a plurality of pages in response to the plurality of write commands.

According to at least some example embodiments, when a power is turned off before remapping, a power-off recovery operation is performed using direction data stored in each of the plurality of pages.

According to at least some example embodiments, a second map table is used to map the physical area onto the first logical area or to remap the physical area onto the second logical area and is updated when a predetermined number of pages is stored. When a power is turned off before remapping, a power-off recovery operation is performed by performing a read operation from a finally stored page to a page having direction data indicating an end of a transaction based on the second map table.

According to at least some example embodiments, the writing method further comprises, when the first logical area does not include a size of a usable space, issuing a remap command by the host.

According to at least some example embodiments, the host determines whether the usable space is less than a predetermined value, using the first map table.

According to at least some example embodiments, the storage determines whether the usable space is less than a predetermined value and sends the determination result to the host.

According to at least some example embodiments, the writing method further comprises determining whether data sent to a file system is random data; as a consequence of determining that data sent to a file system is random data, gathering the random data; converting addresses corresponding to the gathered random data into first logical addresses being continuous; sequentially writing the gathered random data to physical areas of the storage according to the first logical addresses; and remapping the first logical addresses onto the addresses when a size of a usable space of the first logical area is less than a predetermined value.

According to at least some example embodiments, the writing method further comprises buffering the random data using a random writing buffer before sequentially writing the gathered random data.

Another aspect of at least one example embodiment of the inventive concepts is directed to provide a storage system which comprises a host which comprises one or more processor, a main memory to store data needed for a processing operation of the one or more processor, and a first map table to map a first logical area onto a second logical area; and a storage which is connected to the host and comprises one or more nonvolatile memory devices and a second map table for mapping a physical area of the one or more nonvolatile memory devices onto the first logical area at a writing operation or remapping the physical area onto the second logical area based on a remap command, wherein a size of a usable space of the first logical area is less than a predetermined value, the host issues the remap command to the storage.

According to at least some example embodiments, the writing operation is a transaction writing operation by a journaling system.

According to at least some example embodiments, the writing operation is a random writing operation by a file system.

According to at least some example embodiments, the storage further comprises a random writing buffer to buffer random data at the random writing operation, and random data buffered by the random writing buffer is stored in the physical area corresponding to the first logical area.

According to at least some example embodiments, the writing operation is performed by a plurality of write commands. When user page data is written to a plurality of pages in response to the plurality of write commands, a first logical address of the first logical area, a second logical address of the second logical area, and direction data indicating whether to be last data of the writing operation are together written in each of the plurality of pages.

According to at least some example embodiments, the second map table is recovered using the direction data at power-off.

According to at least some example embodiments, when a read request on the second logical area is issued from a file system, a disk driver of the host determines whether the second map table is before remapping, using the first map table and sends a read request according to the first logical address to the storage as a consequence of determining that the second map table is before remapping.

According to at least some example embodiments, the host is an application processor and the storage is an eMMC.

Still another aspect of embodiments of at least one example embodiment of the inventive concepts is directed to provide a writing method of a storage system which includes a host having a first map table for mapping a first logical address and a second logical address and a storage connected to the host. The writing method comprises writing data to a physical area of the storage; updating a second map table to map the first logical address onto a physical address corresponding to the physical area; and updating the second map table in response to a remap command to map the physical address onto the second logical address, wherein the host issues the remap command using the first map table.

A further aspect of at least one example embodiment of the inventive concepts is directed to provide a writing method of a storage system which includes a host and a storage connected to the storage. The writing method comprises writing journal data to a physical area corresponding to a first logical area at generation of a transaction; and remapping a logical area of journal data written to the physical area onto a second logical area from the first logical area when a size of a usable space of the first logical area is less than a predetermined value.

A journaling method using an application programming interface (API) of a program running on a host is provided which comprises generating a plurality of entries each formed of a first logical address directing a first logical area of the storage and a second logical address directing a second logical area of the storage at a journaling writing request; sending journal data and the plurality of entries to the storage so as to be stored in a physical area corresponding to the first logical area; and issuing a remapping command for changing a logical area of journal data written to the physical area into the second logical area from the first logical area when a size of a usable space of the first logical area is less than a predetermined value.

According to at least one example embodiment of the inventive concepts, a writing method of a storage system which includes a host and a storage connected to the storage system includes receiving journal data; adding, into a first page mapping table, a first entry corresponding to the journal data, the first entry mapping a journal logical address to an original logical address; writing the received journal data into the storage at a first physical address; adding, into a second page mapping table, a second entry corresponding to the journal data, the second entry mapping the journal logical address to the first physical address; receiving a remapping command at the storage; and in response to receiving the remapping command, updating the second page mapping table such that the second page mapping table includes an entry mapping the original logical address, and not the journal logical address, to the first physical address.

The method of claim may further include removing the first entry from the first mapping table after the updating the second page mapping table, in response to the receiving the remapping command.

The method may further include storing the first mapping table in the host.

The method my further include storing the second mapping table in the storage.

BRIEF DESCRIPTION OF THE FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
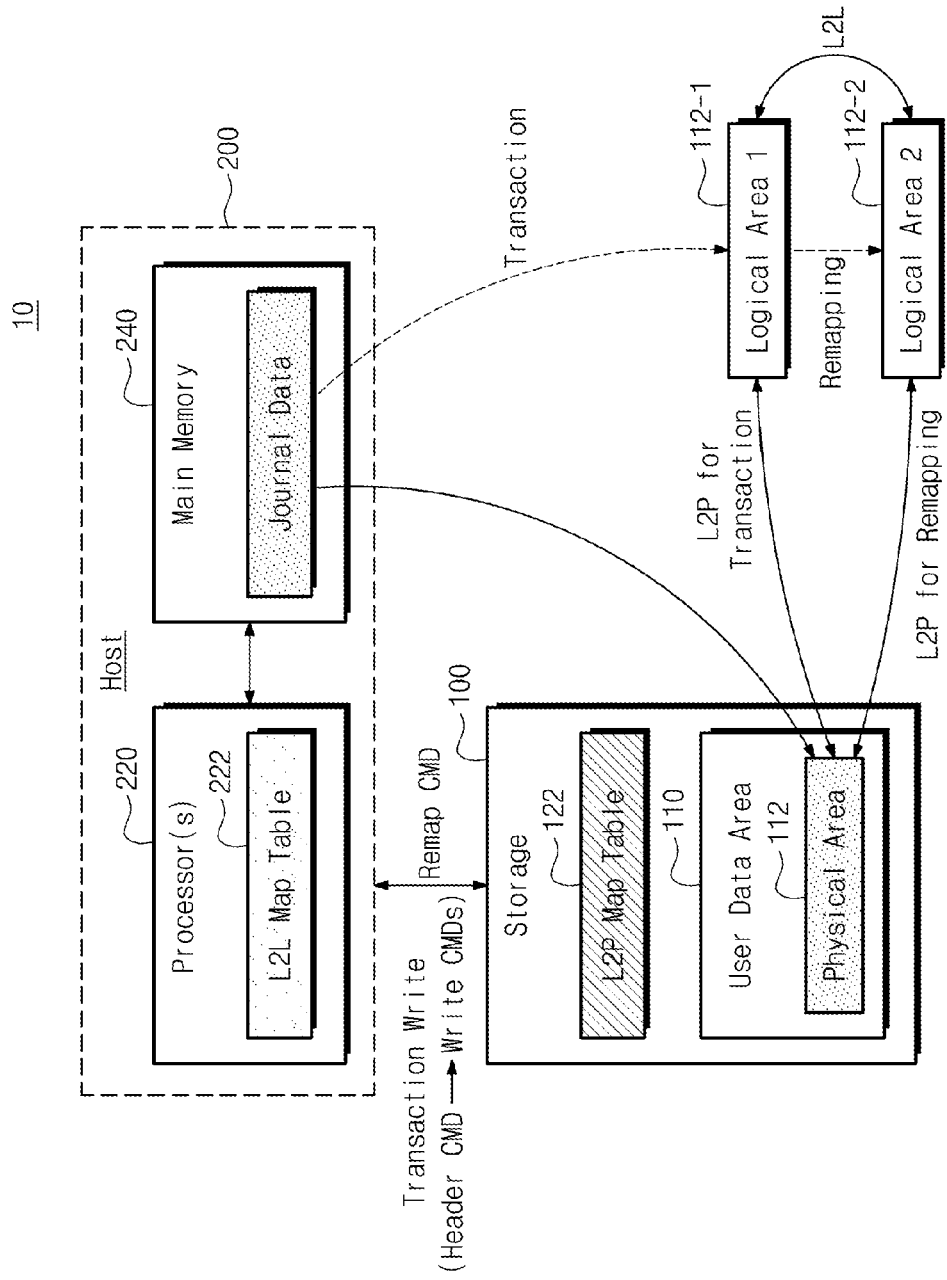
FIG. 1 is a diagram schematically illustrating a storage system according to at least one example embodiment of the inventive concepts.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

A storage system implemented by a nonvolatile memory device according to at least one example embodiment of the inventive concepts and a write method of the storage system may improve the performance of storage by performing remapping where a first logical area corresponding to a physical area is converted into a second logical area based on a remap command generated according to a storage condition. Herein, the storage condition may be information associated with a size of a usable space of the first logical area/the second logical area.

Below, a nonvolatile memory device may be a NAND flash memory, a vertical NAND flash memory (VNAND), a NOR flash memory, a resistive RAM (RRAM), a phase-change RAM (PRAM), a magnetoresistive RAM (MRAM), an STT-RAM (Spin Transfer Torque Random Access Memory), etc. Also, the nonvolatile memory device is implemented to have a three-dimensional array structure. The inventive concepts are applicable to not only a flash memory device where a charge storage layer is formed of a floating gate, but also a charge trap flash (CTF) memory where a charge storage layer is formed of an insulation film. Below, it is assumed that a nonvolatile memory device is a NAND flash memory device.

FIG. 1 is a diagram schematically illustrating a storage system according to at least one example embodiment of the inventive concepts. Referring to FIG. 1, a storage system 10 includes storage (or, a disk) 100 and a host 200.

The storage 100 includes a user data area 110 and an L2P map table 122.

The user data area 110 is implemented by a nonvolatile memory device. As illustrated in FIG. 1, a physical area 112 is mapped onto a first logical area (or, a journal data area) 112-1 and a second logical area (or, a disk data area) 112-2.

The L2P map table (or, a second map table) 122 stores information on an address (hereinafter, referred to as a logical address) of a logical area and an address (hereinafter, referred to as a physical address) of a physical area corresponding to the logical address. The L2P map table 122 may be managed by a flash translation layer (FTL) in terms of a software layer. The FTL of the storage 100 converts a logical address transferred from the host 200 into a physical address using the L2P map table 122.

In other words, the storage 100 includes the L2P map table 122 that maps the physical area 110 onto the first logical area 112-1 or remaps the physical area 110 onto the second logical area 112-2.

The host 200 manages the storage 100. The host 200 includes one or more processors 220 and a main memory 240.

The processor 220 controls an overall operation of the host 200. The processor 220 performs various computing functions such as a function of executing particular software for particular calculations or performing of tasks. The processor 220 executes various programs such as an operating system (OS), applications, etc. The OS and/or an application is stored in the main memory 240 or in internal memories (not shown) of the host 200.

The host 200 includes an L2L map table (or, a first map table) 222. The host 200 constructs and manages the L2L map table 222. The L2L map table 222 is formed of entries each associated with a pair of addresses including an address (hereinafter, referred to as a second logical address) of the second logical area 112-2 that corresponds to an address (hereinafter, a first logical address) of the first logical area 112-1.

The main memory 240 stores data needed for driving of the processor 220. According to at least some example embodiments of the inventive concepts, the main memory 240 is implemented by a volatile memory (e.g., a DRAM, an SRAM, etc.) or a nonvolatile memory device (e.g., a PRAM, etc.).

Below, there is described a method of processing journal data when transaction such as file update or change is generated. For example, journal data of the main memory 240 is written at the physical area 112 of the storage 100. However, the host 200 may interpret the written journal data of the physical area 112 in two aspects.

First, the host 200 interprets the written journal data of the physical area 112 as a transaction writing operation where the journal data is stored in the first logical area (or, journal data area) 112-1. The transaction writing operation is formed of a header command directing a transaction writing operation and a plurality of write commands for writing the journal data at the physical area 112.

The header command includes a part of the L2L map table 222 corresponding to a plurality of write commands, that is, entries. That is, during the transaction writing operation, the host 200 sends a part of the L2L map table 222 to the storage 100 using the header command.

Second, the host 200 interprets the written journal data of the physical area 112 as remapping where the journal data is moved to the second logical area 112-2. Here, the remapping means an operation of converting a first logical address of the first logical area 112-1 corresponding to the physical area 112 into a second logical address of the second logical area 112-2 at transaction writing.

According to at least some example embodiments of the inventive concepts, the remapping is performed based on a remap command of the host 200. That is, the L2P map table (hereinafter, referred to as a second map table) 122 is changed by the remapping.

According to at least some example embodiments of the inventive concepts, the remap command is issued by the host 200 when the size of usable space of the first logical area 112-1 is smaller than a predetermined or, alternatively, desired value. For example, when usable space does not exist in the first logical area 112-1 because the first logical area 112-1 is full, the remap command is issued.

According to at least some example embodiments of the inventive concepts, sizes of the first and second logical areas 112-1 and 112-2 are configured and/or changed by the host 200.

In other exemplary embodiments, sizes of the first and second logical areas 112-1 and 112-2 are configured and/or changed by the storage 100.

According to at least some example embodiments of the inventive concepts, the host 200 issues the remap command based on information regarding a size of a usable space of the first logical area 112-1. For example, the host 200 may be provided with information regarding a size of a usable space of the first logical area 112-1 from the storage 100. Alternatively, the host 200 may receive information regarding a size of usable space of the first logical area 112-1 using the L2L map table (first map table) 222.

According to at least some example embodiments of the inventive concepts, the host 200 removes or deletes remapping-completed entries from the L2L map table 222.

A conventional storage system first writes journal data at a journal data area at generation of a transaction, and then rewrites the journal data at an original data area at a point in time when a check point is generated or when a dirty page of the main memory 240 is flushed. Consequent, duplication of the journal data may result in the conventional storage system.

On the other hand, when a transaction is generated, the storage system 10 according to at least one example embodiment of the inventive concepts performs a writing operation on the physical area 112 once and performs journaling using the remapping. Thus, the storage system 10 according to at least one example embodiment of the inventive concepts prevents duplication writing on journal data.

Further, the storage system 10 according to at least one example embodiment of the inventive concepts performs remapping based on a condition of the storage 100. For example, the storage system 10 may perform remapping based on information regarding a size of usable space of the first logical area 112-1 to reduce the number of update operations on the L2P map table (second map table) 122. Thus, the storage system 10 according to at least one example embodiment of the inventive concepts may provide an improvement in performance by reducing the number of update operations on the L2P map table (second map table) 122.

Figure 2:
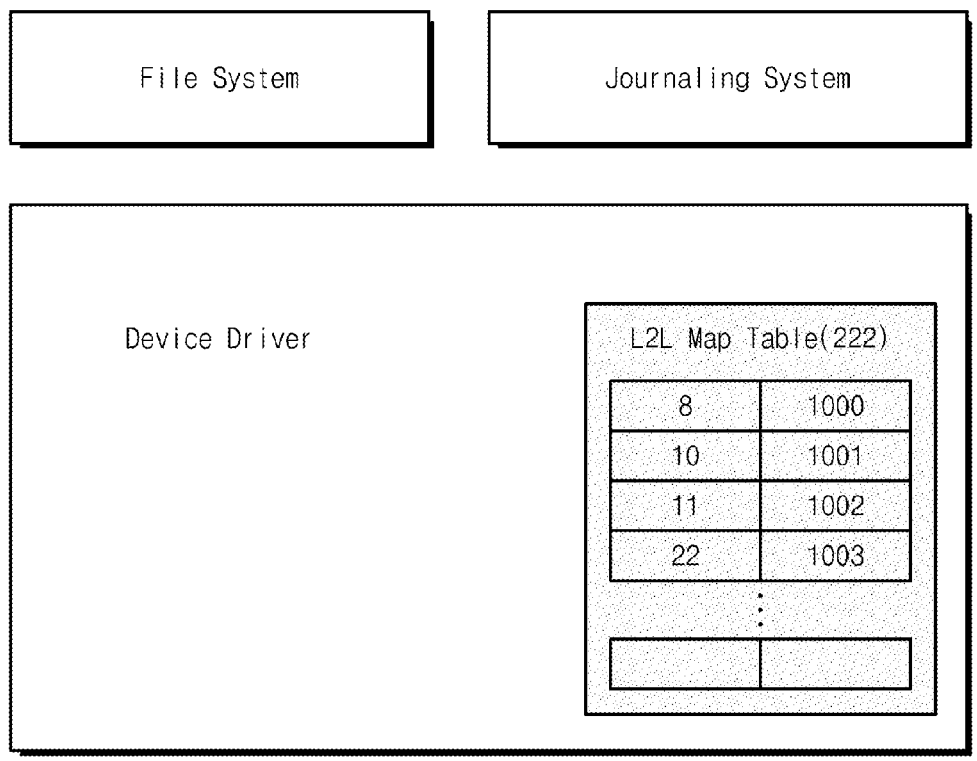
FIG. 2 is a diagram schematically illustrating a software layer of a storage system 10 shown in FIG. 1, according to at least one example embodiment of the inventive concepts.

FIG. 2 is a diagram schematically illustrating a software layer of a storage system 10 shown in FIG. 1, according to at least one example embodiment of the inventive concepts. Referring to FIG. 2, a host 200 manages storage 100 and includes a file system, a journaling system, and a device driver as software components. The journaling system is used to prevent a part of the file system managing the storage 100 from being corrupted. The device driver drives the storage 100 according to a request of the file system/journal system.

The device driver according to at least one example embodiment of the inventive concepts includes an L2L map table (or, a first map table) 222. When writing/reading on journal data is requested by the journal system, the device driver determines whether an address according to the write/read request exists or whether to change an address, using the L2L map table 222. The device driver transfers the write/read request to the storage 100 according to the determination result. The storage 100 performs a write/read operation on the storage 100 according to the write/read request transferred from the device driver.

Figure 3:
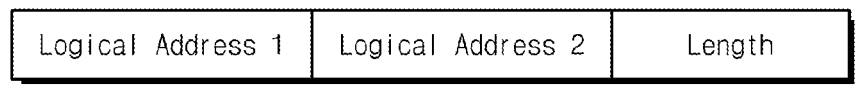
FIG. 3 is a diagram schematically illustrating an entry of an L2L map table 222 shown in FIG. 2, according to at least one example embodiment of the inventive concepts.

FIG. 3 is a diagram schematically illustrating an entry of an L2L map table 222 shown in FIG. 2, according to at least one example embodiment of the inventive concepts. Referring to FIG. 3, an entry of an L2L map table 222 includes a first logical address, a second logical address, and a length.

According to at least some example embodiments of the inventive concepts, the first logical address is a journal address and the second logical address is a disk address.

According to at least some example embodiments of the inventive concepts, the length is a value corresponding to the number of write commands of a transaction writing operation corresponding to the first and second logical addresses.

According to at least some example embodiments of the inventive concepts, a device driver generates an entry of the L2L map table 222 when a journaling system requests a transaction writing operation.

Figure 4:
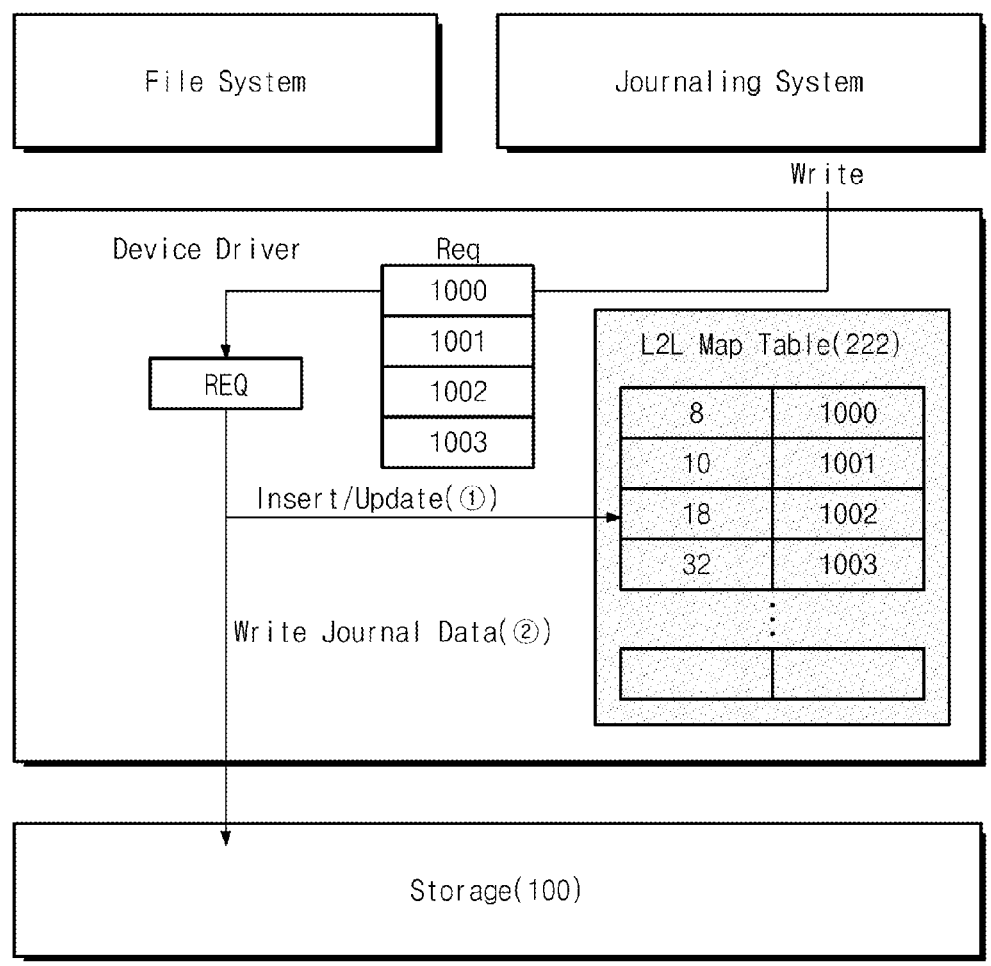
FIG. 4 is a diagram schematically illustrating a journal data writing operation of a storage system 10 according to at least one example embodiment of the inventive concepts.

FIG. 4 is a diagram schematically illustrating a journal data writing operation of a storage system 10 according to at least one example embodiment of the inventive concepts. Referring to FIG. 4, when a write request is received from a journaling system during generation of a transaction, a device driver determines whether an L2L map table 222 includes entries associated with write requested addresses (or, journal addresses) '1000', '1001', '1002', and '1003'. For ease of description, in FIG. 4, there is illustrated an embodiment where the number of write requested addresses is 4. However, example embodiments of the inventive concepts are not limited thereto.

If the L2L map table 222 does not include entries associated with write requested addresses '1000', '1001', '1002', and '1003', the device driver performs generation and insertion on at least one entry associated with the L2L map table 222.

If the L2L map table 222 includes at least one of entries associated with write requested addresses '1000', '1001', '1002', and '1003', the device driver updates at least one entry associated with the L2L map table 222.

Afterwards, the device driver generates a header command including entries associated with write requested addresses '1000', '1001', '1002', and '1003' and provides the header command to storage 100.

Then, the device driver issues a plurality of write commands for writing journal data corresponding to the write requested addresses '1000', '1001', '1002', and '1003' at a physical area 112 (refer to FIG. 1) of the storage 100, and transfers the write commands and journal data to the storage 100. Here, each write command may include context identification indicating whether journal data is last data of a transaction writing operation. For example, context identification of '0' means that journal data is not last data of a transaction writing operation, and context identification of '1' means that journal data is last data of a transaction writing operation.

The storage 100 receives the header command, the write commands, and the journal data, and writes the journal data at physical areas respectively corresponding to the write requested addresses '1000', '1001', '1002', and '1003'. At this time, the write requested addresses '1000', '1001', '1002', and '1003' are stored in the physical areas together with the journal data. For example, when journal data is stored in a physical area corresponding to the journal address of '1000', a first logical address (or, a journal address) of '1000' and a second logical address (or, a disk address) of '8' associated with the journal address of '1000' are together stored in the physical area.

According to at least some example embodiments of the inventive concepts, when journal data is stored in physical areas respectively corresponding to the write requested addresses '1000', '1001', '1002', and '1003', indication data indicating whether data to be written is last data of journal data is also stored. Here, the indication data may be values corresponding to context identification included in write commands.

Figure 5:
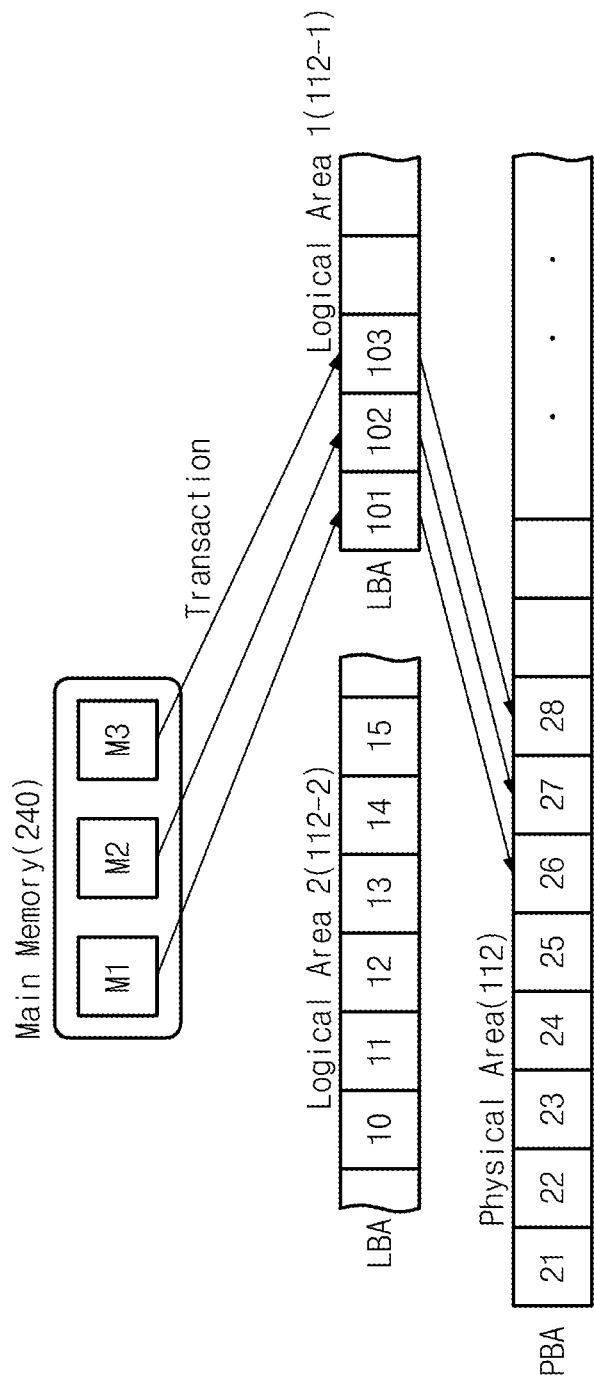
FIG. 5 is a diagram schematically illustrating a journal data writing operation according to at least one example embodiment of the inventive concepts.

FIG. 5 is a diagram schematically illustrating a journal data writing operation according to at least one example embodiment of the inventive concepts. Referring to FIG. 5, when a transaction is generated, journal data stored in memory units M1, M2, and M3 of a main memory 240 is written at physical areas 26, 27, and 28 of a user data area 110 corresponding to addresses 101, 102, and 103 of a first logical area through a transaction writing operation, respectively.

Figure 6:
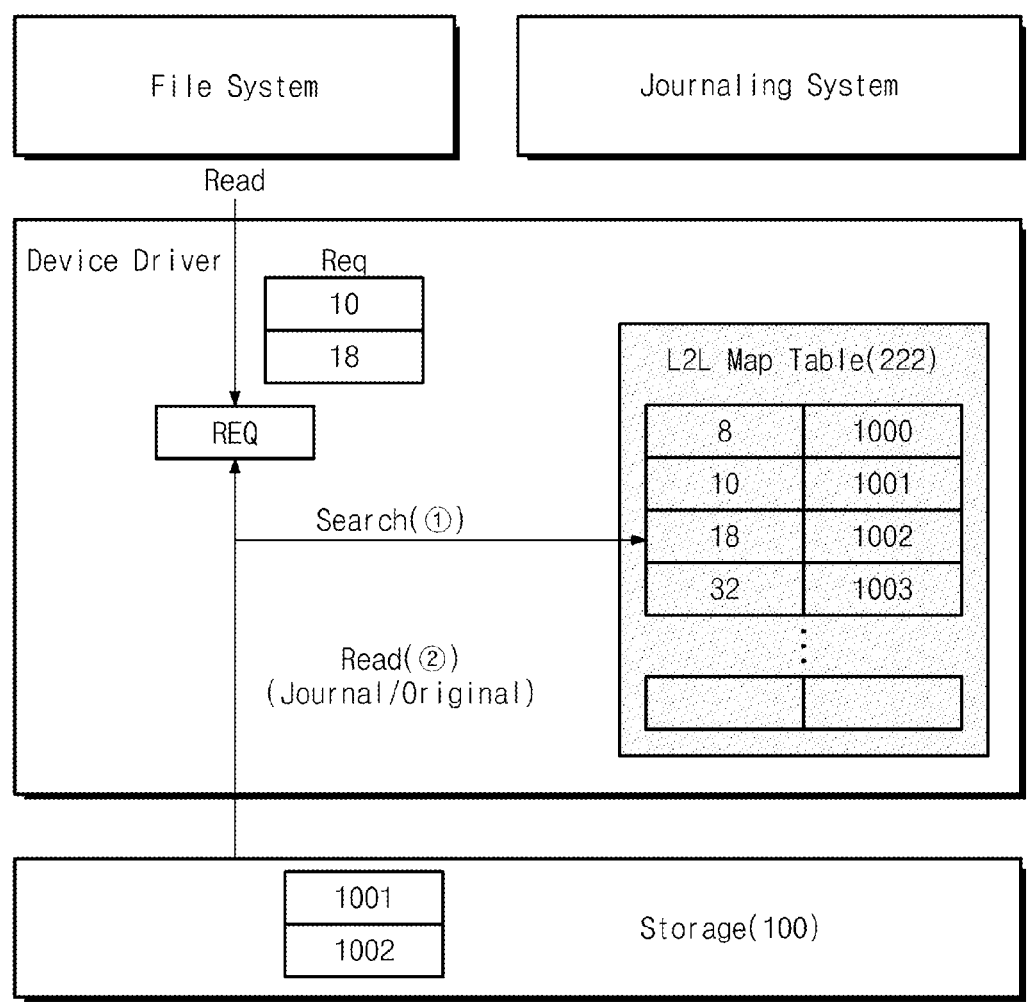
FIG. 6 is a diagram schematically illustrating a reading operation of a storage system according to at least one example embodiment of the inventive concepts.

FIG. 6 is a diagram schematically illustrating a reading operation of a storage system according to at least one example embodiment of the inventive concepts. In FIG. 6, for ease of description, it is assumed that a file system issues a read request on addresses 10 and 18. A device driver determines whether entries associated with the read requested addresses 10 and 18 exist in an L2L map table 222, based on an input read request. As a consequence of determining that entries associated with the read requested addresses 10 and 18 exist in the L2L map table 222, the device driver changes the read requested addresses 10 and 18 into corresponding journal addresses 1001 and 1002 and transfers a read request to storage 100 using the changed journal addresses 1001 and 1002. The storage 100 reads data corresponding to the journal addresses 1001 and 1002 and sends the read data to a host 200.

As a consequence of determining that entries associated with the read requested addresses 10 and 18 don't exist in the L2L map table 222, the device driver sends a read request corresponding to the read requested addresses 10 and 18 to the storage 100. The storage 100 reads data corresponding to the original addresses 10 and 18 and transmits the read data to the host 200.

Figure 7:
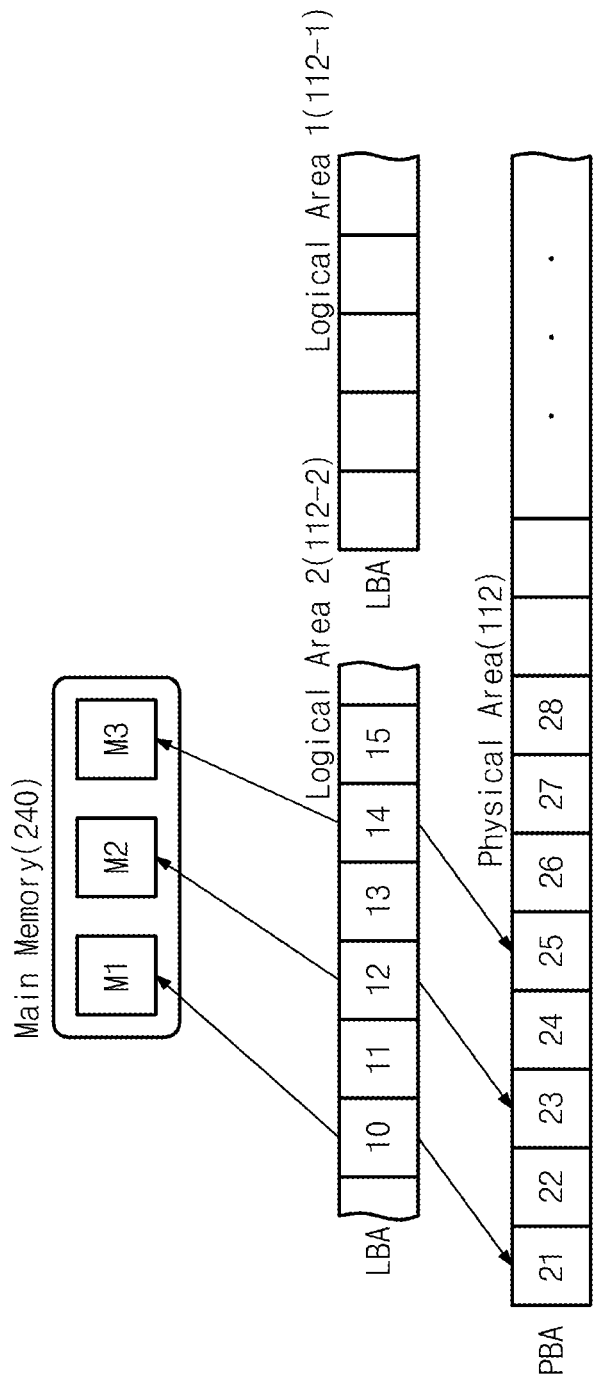
FIG. 7 is a diagram schematically illustrating a read operation of a storage system 10 according to at least one example embodiment of the inventive concepts.

FIG. 7 is a diagram schematically illustrating a read operation of a storage system 10 according to at least one example embodiment of the inventive concepts. Referring to FIG. 7, in response to a read request provided from a host 200, storage 100 reads data from physical areas of addresses 21, 23, and 25 of a user data area 110 corresponding to addresses 10, 12, and 15 of a second logical area. The storage 100 transfers the read data to memory units M1, M2, and M3 of a main memory 240.

Figure 8:
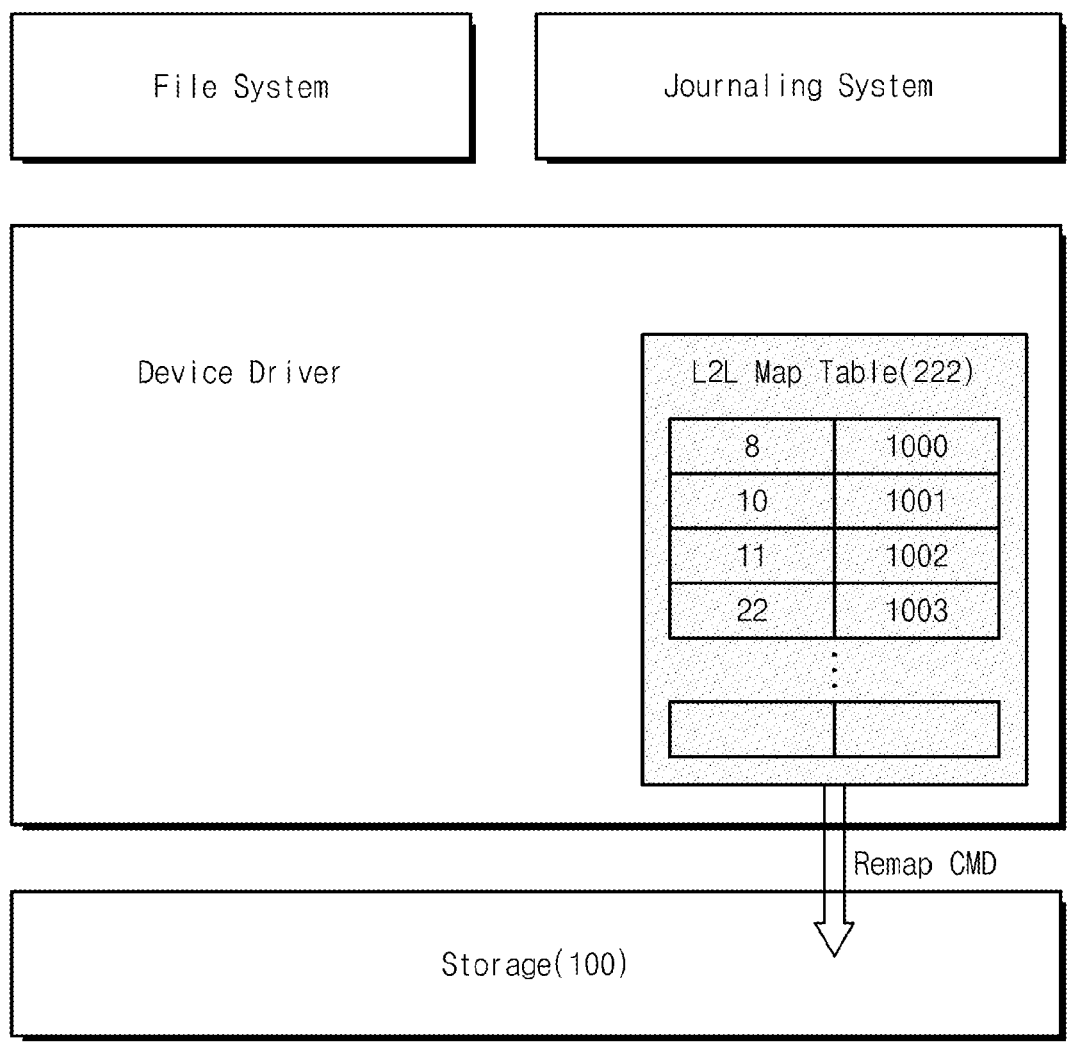
FIG. 8 is a diagram schematically illustrating remapping of a storage system 100 according to at least one example embodiment of the inventive concepts.

FIG. 8 is a diagram schematically illustrating remapping of a storage system 100 according to at least one example embodiment of the inventive concepts. Referring to FIG. 8, a host 200 issues a remap command. For example, a device driver determines whether a size of usable space of a first logical area 122-1 is less than a predetermined or, alternatively, desired value, based on an L2L map table 222. As a consequence of determining that the usable space of a first logical area 122-1 is less than the predetermined or, alternatively, desired value, the device driver issues a remap command to storage 100. Here, the remap command includes entries of an L2L map table (or, a first map table) 222 associated with remapping. Meanwhile, entries transferred using the remap command are deleted from the L2L map table 222.

The storage 100 updates an L2P map table (or, a second map table) 122 in response to the remap command such that a first logical address is changed into a second logical address.

Figure 9:
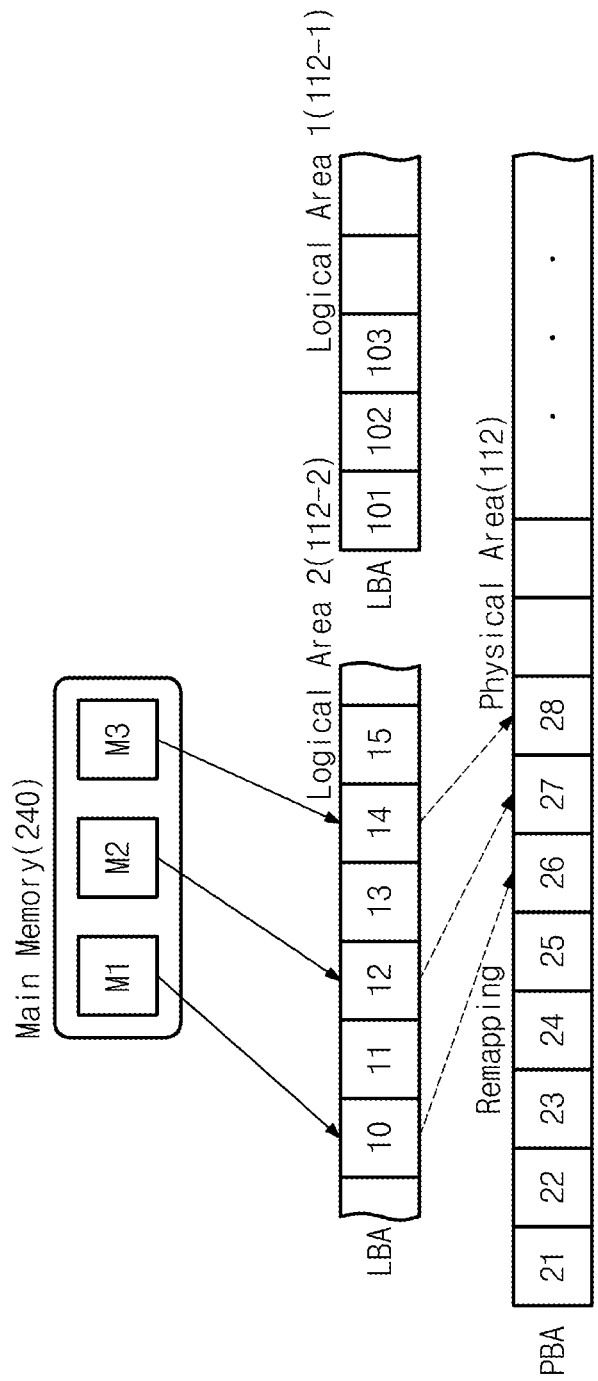
FIG. 9 is a diagram schematically illustrating remapping of a storage system according to at least one example embodiment of the inventive concepts.

FIG. 9 is a diagram schematically illustrating remapping of a storage system according to at least one example embodiment of the inventive concepts. Referring to FIG. 9, storage 100 updates an L2P map table 122 in response to a remap command such that addresses 101, 102, and 103 of a first logical area are changed into addresses 10, 12, and 14 of a second logical area, respectively. Referring to the L2P map table 122 after remapping, the logical addresses 10, 12, and 14 correspond to physical addresses 26, 27, and 28, respectively. The logical addresses 10, 11, and 14 correspond to memory units M1, M2, and M3, respectively.

A storage system 10 according to at least one example embodiment of the inventive concepts supports data journaling as well as journaling on metadata. That is, at least some example embodiments of the inventive concepts are applicable to random writing. Here, the random writing means that write requested addresses are not continuous. At least some example embodiments of the inventive concepts gather random data, change addresses corresponding to random data into first logical addresses (e.g., journal addresses) being continuous, write the gathered random data according to an order of the first logical addresses thus changed, and perform remapping.

Figure 10:
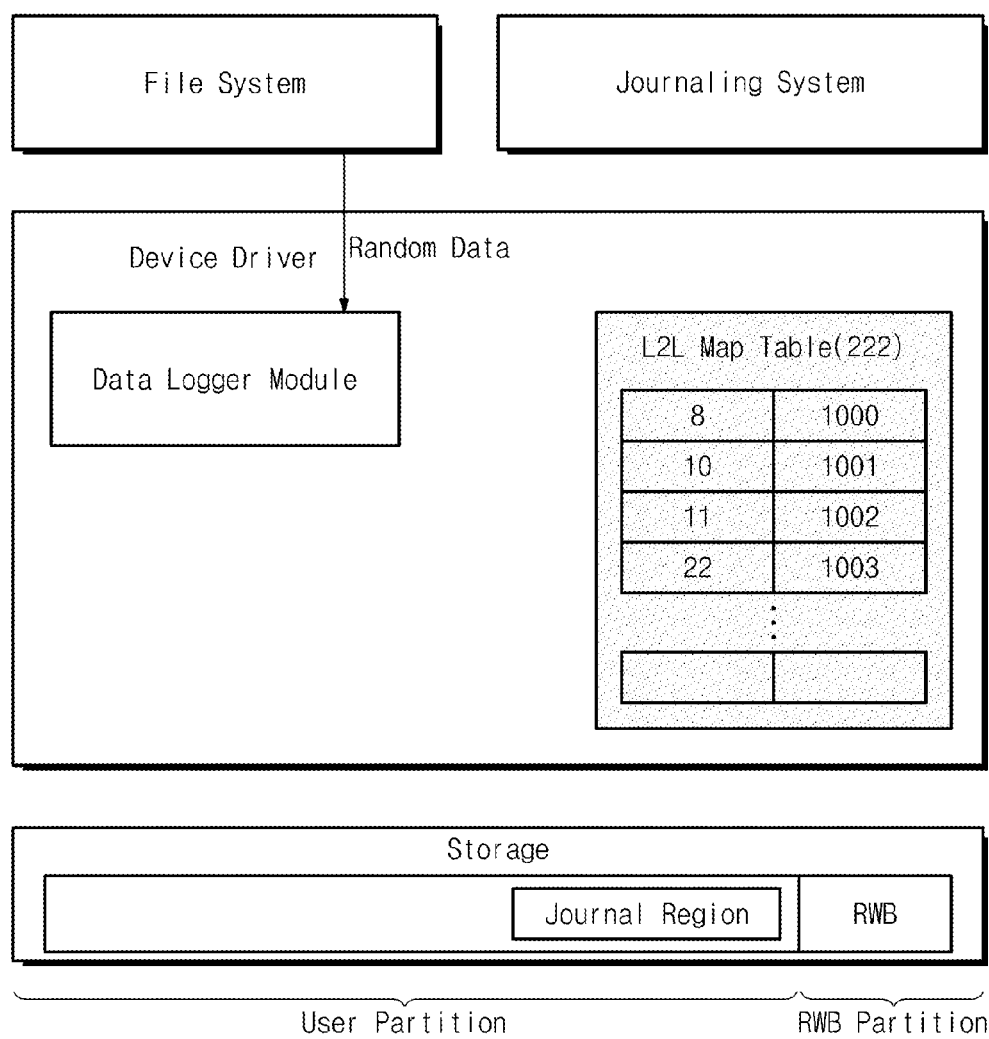
FIG. 10 is a diagram schematically illustrating a software layer for describing random writing of a storage system 10 according to at least one example embodiment of the inventive concepts.

FIG. 10 is a diagram schematically illustrating a software layer for describing random writing of a storage system 10 according to at least one example embodiment of the inventive concepts. Referring to FIG. 10, a device driver includes a data logger module that determines whether a write request provided from a file system/journaling system is random writing request and gathers random data according to a random writing request. The device driver changes addresses corresponding to the gathered random data into first logical addresses (e.g., journal addresses) being continuous. Storage 100 stores the gathered random data according to an order of the first logical addresses thus changed. Afterwards, the storage 100 performs remapping in response to a remap command.

According to at least some example embodiments of the inventive concepts, the storage includes a random writing buffer RWB that sequentially buffers random data according to first logical addresses.

According to at least some example embodiments of the inventive concepts, random data stored in the random writing buffer RWB is stored in a physical area of a user data area corresponding to a first logical area according to an order of the first logical addresses.

According to at least some example embodiments of the inventive concepts, as illustrated in FIG. 10, the storage 100 is formed of a user partition including a journal area and an RWB partition including the random writing buffer RWB. Here, the journal area is an area where journal data is written through journaling.

Figure 11:
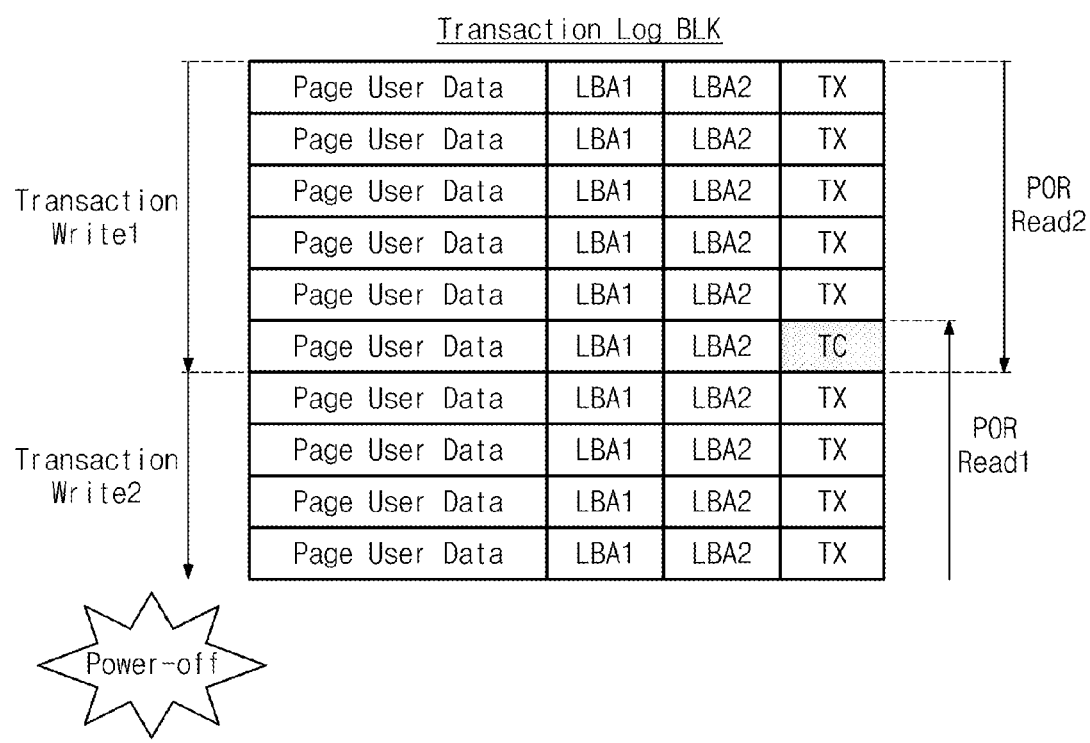
FIG. 11 is a diagram for describing a power-off recovery operation of a storage system 10 according to at least one example embodiment of the inventive concepts.

FIG. 11 is a diagram for describing a power-off recovery operation of a storage system 10 according to at least one example embodiment of the inventive concepts. In FIG. 11, for ease of description, it is assumed that a power is turned off during a second transaction writing operation Transaction Write 2. A transaction writing operation stores a first logical address LBA1, a second logical address LBA2, and indication data TX/TC indicating whether a transaction is completed, in each page.

At a power-off recovery operation, first, a first reading operation POR Read1 is performed from a last page of a transaction log block until a page having 'TC' is detected. If the page having 'TC' is detected, a second reading operation POR Read2 is performed from a first page of the transaction log block to a page having 'TC'. Here, an L2P map table (referred to as a second map table or a logical-to-physical address conversion table) 122 is recovered based on page data read according to the second reading operation POR Read2.

Figure 12:
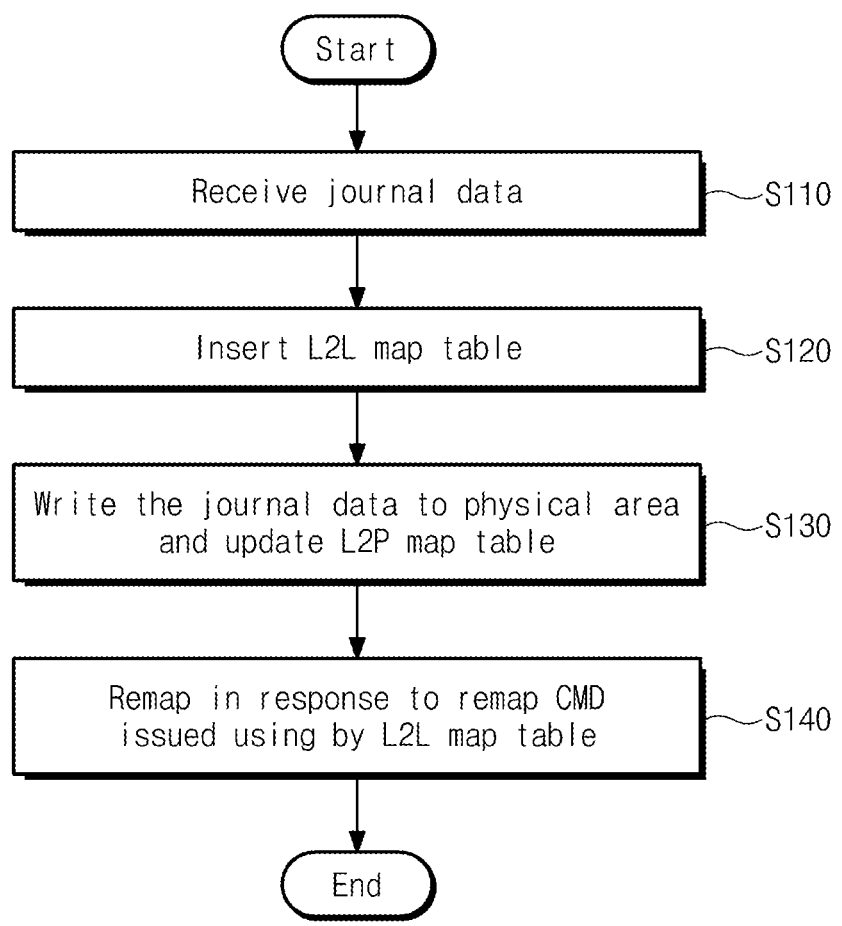
FIG. 12 is a flow chart schematically illustrating a journal data writing method of a storage system according to at least one example embodiment of the inventive concepts.

FIG. 12 is a flow chart schematically illustrating a journal data writing method of a storage system according to at least one example embodiment of the inventive concepts. Referring to FIG. 12, in step S110, journal data is provided from a journaling system to a device driver. A page cache corresponding to the journal data is updated on a main memory. In step S120, the device driver generates a pair of a first logical address and a second logical address corresponding to the journal data and inserts an entry associated with an address pair thus generated in an L2L map table (referred to as a first map table or a logical-to-logical address conversion table) 222. In step S130, a header command and a plurality of write commands are issued, journal data is written at a physical area corresponding to a first logical address of storage 100 according to the header command and the write commands, an L2P map table (referred to as a second map table or a logical-to-physical address conversion table) 122 is updated. During a journal data writing operation according to the write command, transaction complete indication data, for example the indicator TX/TC, is stored. The transaction complete indication data indicates whether data is last data of the journal data.

Afterwards, when the system 10 determines that the size of usable space of the first logical area is less than a predetermined or, alternatively, desired value using the L2L map table 222, a remap command is issued. The storage 100 performs a remapping operation in response to the remap command. Here, remapping updates the L2P map table 122 by changing a first logical address (or, a journal address) corresponding to a physical address into a second logical address (or, an original address) (S140).

Figure 13:
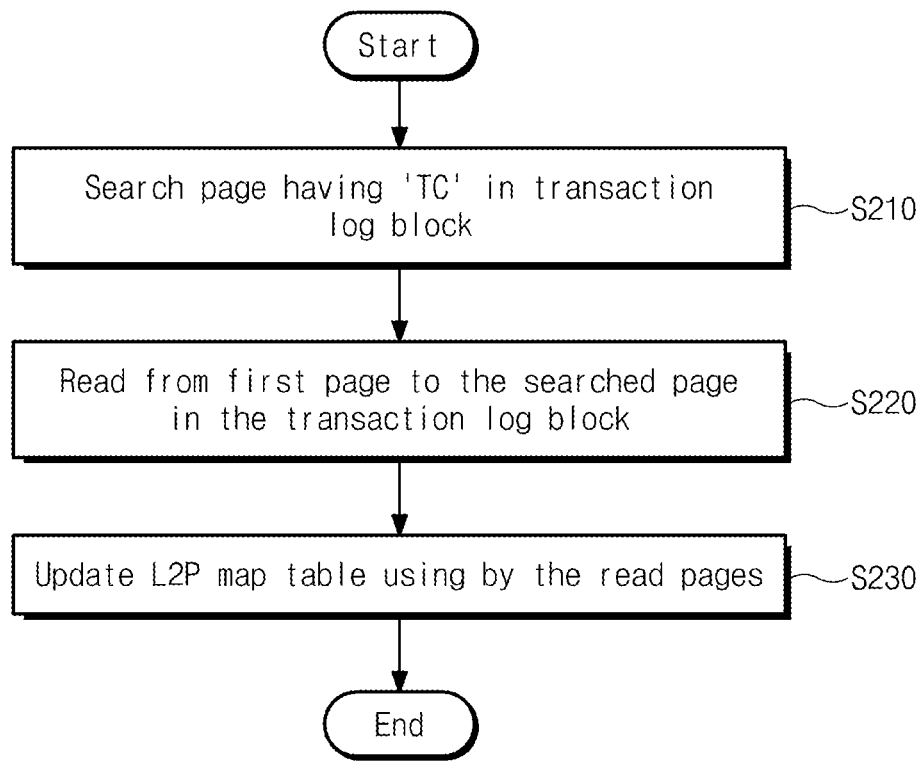
FIG. 13 is a flow chart schematically illustrating a power-off recovery method according to at least one example embodiment of the inventive concepts.

FIG. 13 is a flow chart schematically illustrating a power-off recovery method according to at least one example embodiment of the inventive concepts. Referring to FIGS. 11 and 13, in step S210, a page having corresponding transaction completion data indicating that the transaction is complete, for example the indicator 'TC', is searched from a transaction log block. In step S230, page data is read from a first page of the transaction log block to the searched page. Afterwards, in step S230, an L2P map table 122 is updated using the read page data.

According to at least some example embodiments of the inventive concepts, a page map table is periodically updated in the transaction log block. For example, the map table is updated whenever ten pages are written. In this case, a power-off recovery method is as follows.

Figure 14:
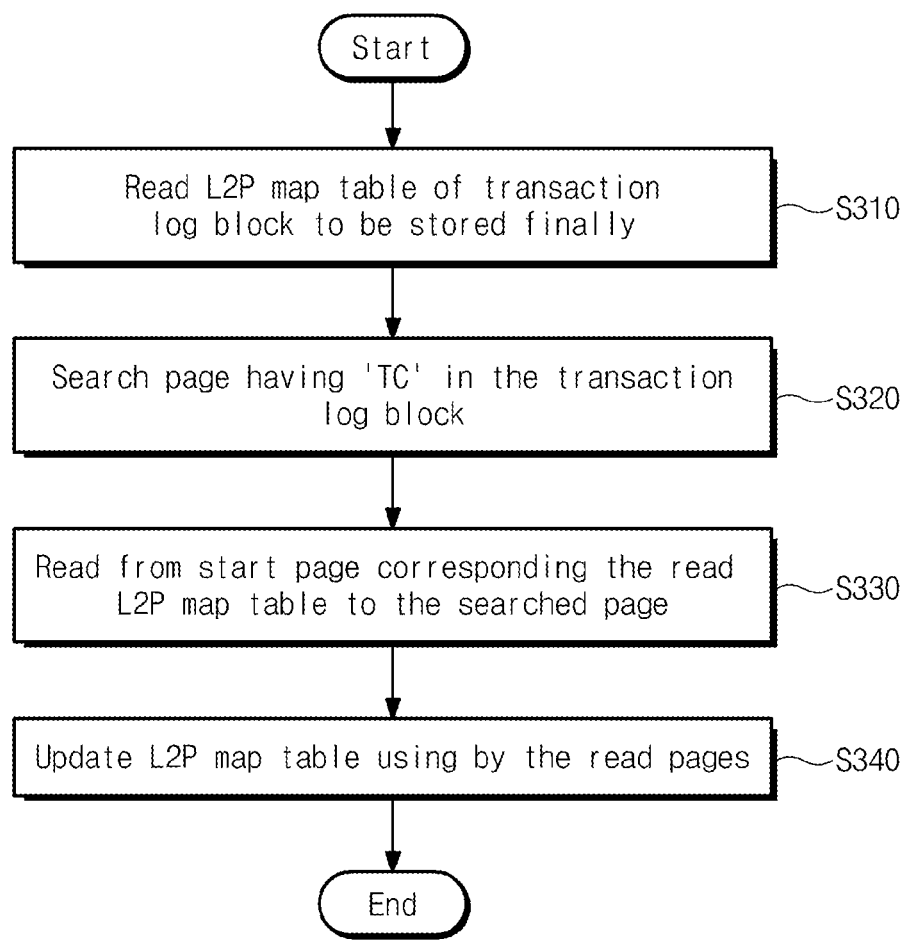
FIG. 14 is a flow chart schematically illustrating a power-off recovery method according to at least one example embodiment of the inventive concepts.

FIG. 14 is a flow chart schematically illustrating a power-off recovery method according to at least one example embodiment of the inventive concepts. Referring to FIGS. 11 and 14, in step S310, an L2P map table of a transaction log block that is finally stored is read. In step S320, a page having corresponding transaction completion data indicating that the transaction is complete, for example the indicator 'TC', is searched from the transaction log block. In step S330, page data is read from a page storing the read map table to the searched page. In step S340, an L2P map table is updated using the read page data.

At least some example embodiments of the inventive concepts are applicable to a solid state drive (SSD).

Figure 15:
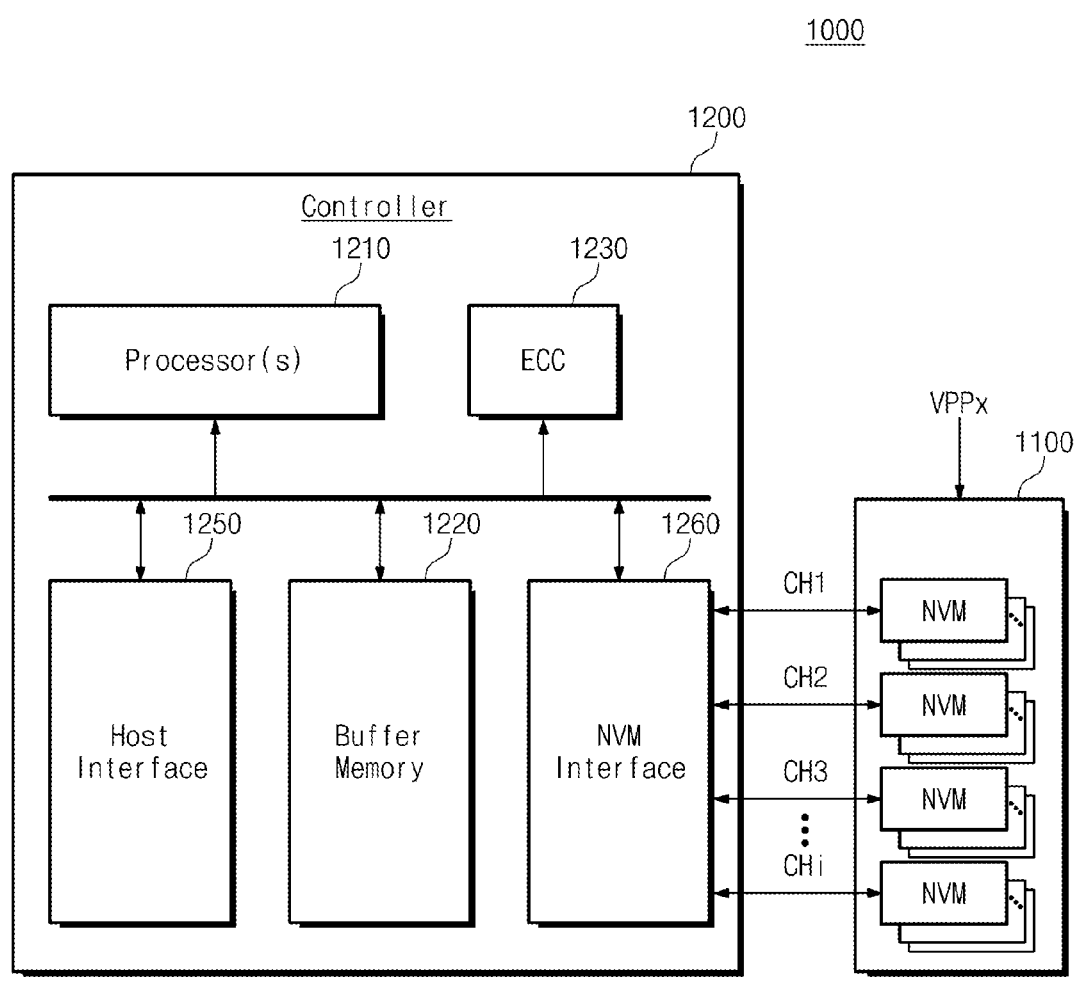
FIG. 15 is a block diagram schematically illustrating a solid state drive according to at least one example embodiment of the inventive concepts.

FIG. 15 is a block diagram schematically illustrating a solid state drive according to at least one example embodiment of the inventive concepts. In the example illustrated in FIG. 15, a solid state drive (hereinafter, referred to as SSD)

1000 includes a plurality of nonvolatile memory devices 1100 and an SSD controller 1200. According to at least one example embodiment of the inventive concepts, the SSD 1000 is implemented to include storage 100 that operates as discussed above with reference to FIGS. 1-14.

The nonvolatile memory devices 1100 are implemented to be provided with an external high voltage Vpp optionally. The SSD controller 1200 is connected to the nonvolatile memory devices 1100 through a plurality of channels CH1 to CHi (i being an integer of 2 or more). In the example illustrated in FIG. 15, the SSD controller 1200 includes one or more processors 1210, a buffer memory 1220, an ECC block 1230, a host interface 1250, and a nonvolatile memory interface 1260.

The buffer memory 1220 stores data needed to drive the SSD controller 1200. The buffer memory 1220 may include a plurality of memory lines each storing data or a command. Here, the memory lines may be mapped onto cache lines 1212 via various methods. In FIG. 15, there is illustrated an embodiment where the buffer 1220 is included in the SSD controller 1200. However, example embodiments of the inventive concepts are not limited thereto. For example, the buffer 1220 may be placed outside the SSD controller 1200. The ECC block 1230 calculates error correction code values of data to be programmed during a writing operation and corrects an error of read data using an error correction code value during a read operation. At a data recovery operation, the ECC block 1230 corrects an error of data recovered from the nonvolatile memory devices 1100. Although not shown in FIG. 15, a code memory is further included to store code data needed to drive the SSD controller 1200. The code memory is implemented by a nonvolatile memory device. The host interface 1250 provides an interface with an external device. The nonvolatile memory interface 1260 provides an interface with the nonvolatile memory devices 1100.

The SSD 1000 according to at least one example embodiment of the inventive concepts improves the performance of system by remapping a logical-to-physical address conversion table based on an external remap command, for example, in accordance with methods discussed above with reference to FIGS. 1-14.

At least some example embodiment of the inventive concepts are applicable to an embedded MultiMediaCard (hereinafter, referred to as eMMC).

Figure 16:
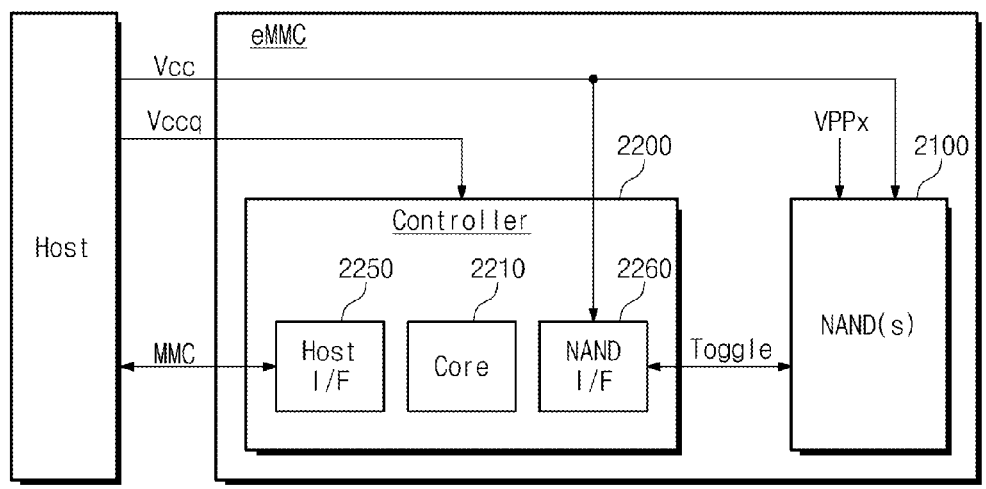
FIG. 16 is a block diagram schematically illustrating an eMMC according to at least one example embodiment of the inventive concepts.

FIG. 16 is a block diagram schematically illustrating an eMMC according to at least one example embodiment of the inventive concepts. Referring to FIG. 16, an eMMC 2000 includes one or more NAND flash memory devices 2100 and controller 2200. The NAND flash memory device 2100 is implemented to perform one-step/multi-step program operations. The eMMC 2000 is implemented by storage 100 shown in FIG. 1.

The controller 2200 is connected with the NAND flash memory device 2100 via a plurality of channels. The controller 2200 includes one or more controller cores 2210, a host interface 2250, and a NAND interface 2260. The controller core 2210 controls an overall operation of the eMMC 2000. The host interface 2250 is configured to perform an interface between the controller 2210 and a host. The NAND interface 2260 is configured to provide an interface between the NAND flash memory device 2100 and the controller 2200. In example embodiments, the host interface 2250 may be a parallel interface (e.g., an MMC interface). In other example embodiments, the host interface 2250 of the eMMC 2000 may be a serial interface (e.g., UHS-II, UFS, etc.). The eMMC 2000 receives power supply voltages Vcc and Vccq from the host. Herein, the power supply voltage Vcc (e.g., about 3.3V) is supplied to the NAND flash memory device 2100 and the NAND interface 2260, and the power supply voltage Vccq (e.g., about 1.8V/3.3V) is supplied to the controller 2200. According to at least some example embodiments, the eMMC 2000 may be optionally supplied with an external high voltage.

The eMMC 2000 according to at least one example embodiment of the inventive concepts utilizes a remapping technique at a journaling or random writing operation, thus evading duplication writing and reducing the number of update operations on an address conversion table.

At least some example embodiment of the inventive concepts are applicable to universal flash storage UFS.

Figure 17:
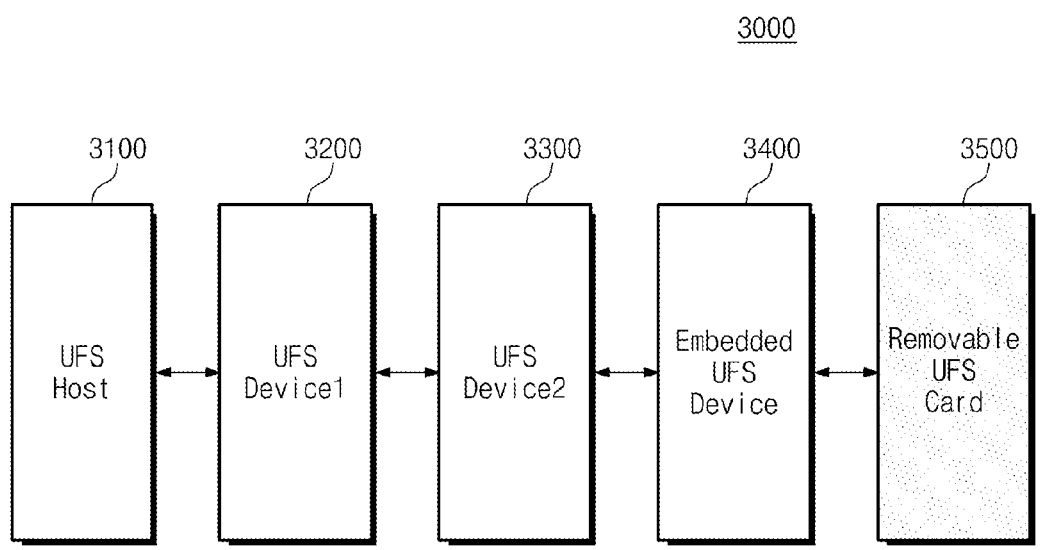
FIG. 17 is a block diagram schematically illustrating a UFS system 3000 according to at least one example embodiment of the inventive concepts.

FIG. 17 is a block diagram schematically illustrating a UFS system 3000 according to at least some example embodiments of the inventive concepts. In the example illustrated in FIG. 17, a UFS system 3000 includes a UFS host 3100, UFS devices 3200 and 3300, an embedded UFS device 3400, and a removable UFS card 3500. The UFS host 3100 is an application processor of a mobile device. The UFS host 3100 is implemented by a host 200 shown in FIG. 1. Each of the UFS host 3100, the UFS devices 3200 and 3300, the embedded UFS device 3400, and the removable UFS card 3500 may communicate with external devices through the UFS protocol. At least one of the UFS devices 3200 and 3300, the embedded UFS device 3400, and the removable UFS card 3500 may be implemented by storage 100 that operates as discussed above with reference to FIGS. 1-14. Meanwhile, the embedded UFS device 3400 and the removable UFS card 3500 may perform communications using protocols different from the UFS protocol. The UFS host 3100 and the removable UFS card 3500 may communicate through various card protocols (e.g., UFDs, MMC, SD (secure digital), mini SD, Micro SD, etc.).

At least some example embodiments of the inventive concepts are applicable to a mobile device.

Figure 18:
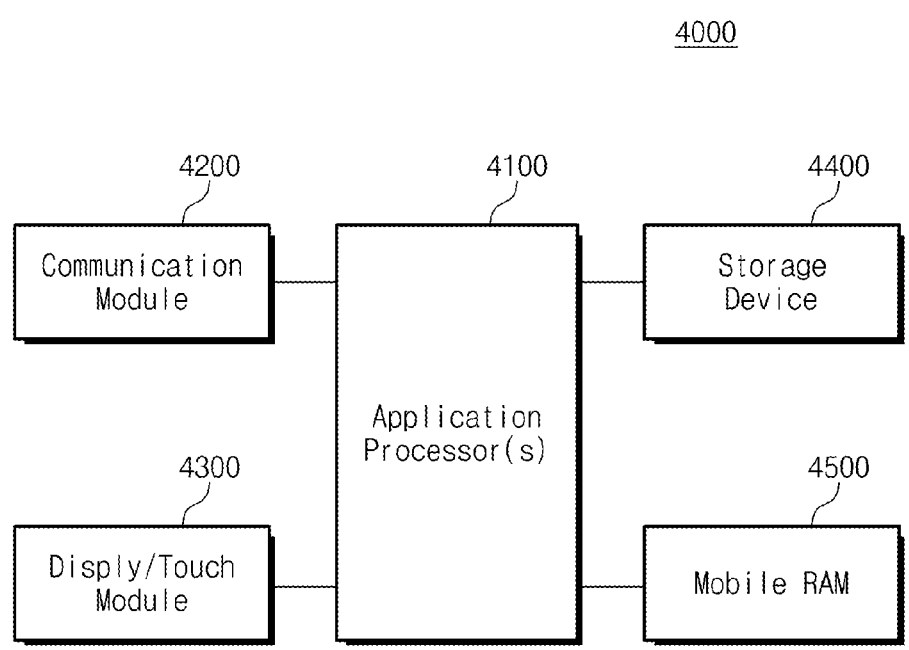
FIG. 18 is a block diagram schematically illustrating a mobile device 4000 according to at least one example embodiment of the inventive concepts.

FIG. 18 is a block diagram schematically illustrating a mobile device 4000 according to at least one example embodiment of the inventive concepts. In the example illustrated in FIG. 18, a mobile device 4000 includes an application processor 4100, a communication module 4200, a display/touch module 4300, and a storage device 4400, and a mobile RAM 4500.

The application processor 4100 controls an overall operation of the mobile device 4000. In particular, the application processor 4100 is implemented by a host 200 shown in FIG. 1. The communication module 4200 is implemented to perform wireless or wire communications with an external device. The display/touch module 4300 is implemented to display data processed by the application processor 4100 or to receive data through a touch panel. The storage device 4400 is implemented to store user data. The storage device 4400 may be eMMC, SSD, UFS device, etc. The storage device 4400 performs a journaling function through transaction writing and remapping operations described with reference to FIGS. 1 to 15. The mobile RAM 4500 is implemented to temporarily store data needed for a processing operation of the mobile device 4000.

At least some example embodiments of the inventive concepts are applicable to a program (e.g., an operating system, an application program, etc.) that is running on a host necessitating journaling writing. Means (e.g., application programming interface: API) for supporting a journaling function on an operating system may be provided. A duplication writing preventing function is applied by using API with a function according to at least one example embodiment of the inventive concepts at an application (e.g., a database program such as SQLite) necessitating a journaling function.

The mobile device 4000 according to at least one example embodiment of the inventive concepts evades duplication writing at a journaling or random writing operation and reduces the number of update operations on a map table by managing the map table according to a condition of the mobile device 4000.

A memory system or a storage device according to at least one example embodiment of the inventive concepts may be packed using various packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package ( ), or the like.

Example embodiments having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A writing method of a storage system which includes a host and a storage connected to the host, comprising:
receiving journal data during a generation of a data writing transaction;
inserting in a first map table, a plurality of entries, each entry including a first logical address of a first logical area of the storage and a second logical address of a second logical area of the storage;
writing the journal data to a physical area of the storage corresponding to the first logical address,
the writing the journal data to a physical area including,
storing user page data, the first logical address and the second logical address in the physical area; and
remapping the physical area from the first logical address onto the second logical address using the plurality of entries when a size of a usable space of the first logical area is less than a desired value.

2. The writing method of claim 1, further comprising:
generating, by the host, the first map table.

3. The writing method of claim 1, further comprising:
sending the first map table to the storage from the host in an operation of recognizing the storage.

4. The writing method of claim 1, wherein each of the plurality of entries includes a first start address of the first logical area, a second start address of the second logical area, and a length indicating a size of the first and second start addresses.

5. The writing method of claim 1, further comprising:
after receiving the journal data, issuing a header command directing a transaction writing operation and a plurality of write commands instructing the writing of the journal data to the physical area.

6. The writing method of claim 5, wherein the header command includes the plurality of entries.

7. The writing method of claim 5, wherein each of the write commands includes a context identification indicating whether the write command is last data of a transaction writing operation.

8. The writing method of claim 1, further comprising:
performing a power-off recovery operation using direction data stored in each of a plurality of pages, when a power is turned off before the remapping.

9. The writing method of claim 1, wherein a second map table is used to map the physical area onto the first logical area or to remap the physical area onto the second logical area, wherein the second map table is updated when a desired number of pages is stored, and
wherein, when a power of the storage system is turned off before the remapping, a power-off recovery operation is performed by performing a read operation from a finally stored page of the user page data to a page of the user page data having direction data indicating an end of a write transaction based on the second map table.

10. The writing method of claim 1, further comprising:
issuing a remap command by the host when the first logical area does not include usable space of a desired size.

11. The writing method of claim 10, wherein the host determines whether the size of the usable space is less than the desired size, using the first map table.

12. The writing method of claim 10, wherein the storage determines whether the size of the usable space is less than the desired size and sends the determination result to the host.

13. The writing method of claim 1, further comprising:
determining whether data sent to a file system is random data;
gathering the random data as a consequence of determining that data sent to a file system is random data;
converting initial addresses corresponding to the gathered random data into continuous first logical addresses of the first logical area;
sequentially writing the gathered random data to physical areas of the storage according to the continuous first logical addresses; and
remapping the physical areas from the continuous first logical addresses onto the initial addresses when a size of a usable space of the first logical area is less than a desired value.

14. The writing method of claim 13, further comprising:
buffering the random data using a random writing buffer before sequentially writing the gathered random data.

15. A storage system comprising:
a host, the host including one or more processors, a main memory to store data needed for a processing operation of the one or more processors, and a first map table to map a first logical area onto a second logical area; and
a storage which is connected to the host and includes one or more nonvolatile memory devices and a second map table for mapping a physical area of the one or more nonvolatile memory devices onto the first logical area based on a writing operation or remapping the physical area onto the second logical area based on a remap command,
wherein the writing operation is performed by a plurality of write commands,
wherein, when user page data is written to a plurality of pages in response to the plurality of write commands, for each page, a first logical address of the first logical area and a second logical address of the second logical area, and wherein the host is configured to issue the remap command to the storage if a size of a usable space of the first logical area is less than a desired value.

16. The storage system of claim 15, wherein the writing operation is a transaction writing operation by a journaling system.

17. The storage system of claim 15, wherein, when a read request on the second logical area is issued from a file system, a disk driver of the host determines whether an address included in the read request is included in the second map table, using the first map table, and sends a read request according to the first logical address to the storage as a consequence of determining that the second map table includes the address included in the read request.

18. A writing method of a storage system which includes a host having a first map table for mapping a first logical address and a second logical address, and
   a storage unit connected to the host, comprising:
   writing data to a physical area of the storage unit,
   the writing the data to a physical area of the storage unit including,
     storing user page data, the first logical address, and the second logical address in a page of the physical area;
     updating a second map table to map the first logical address onto a physical address corresponding to the physical area; and
     updating the second map table in response to a remap command to map the physical address onto the second logical address, wherein the host issues the remap command using the first map table.

19. The writing method of claim 5, wherein the writing the journal data to a physical area further comprises:
   storing direction data indicating whether a transaction corresponding to the plurality of write commands has ended in the physical area.

20. The storage system of claim 15, wherein the writing operation is performed by a plurality of write commands; and
   wherein, when the user page data is written to the plurality of pages in response to the plurality of write commands, for each page, direction data indicating whether the page includes last data of the writing operation is further written in the page.

\* \* \* \* \*